United States Patent [19]

Shah et al.

[11] Patent Number: 4,908,245

[45] Date of Patent: Mar. 13, 1990

[54] SELF RETAINING INJECTION MOLDED SHIMS

[75] Inventors: Burt Shah, 313 Ely Dr., Northville, Mich. 48167; Sam Shah, Detroit, Mich.

[73] Assignee: Burt Shah, Plymouth, Mich.

[21] Appl. No.: 215,342

[22] Filed: Jul. 5, 1988

[51] Int. Cl.⁴ .............................................. F16B 2/00
[52] U.S. Cl. .................................... 428/33; 428/99; 428/131; 428/542.8; 180/253; 280/661
[58] Field of Search ..................... 280/661; 180/253; 428/131, 33, 99, 542.8

[56] References Cited

U.S. PATENT DOCUMENTS 4,195,862  4/1980  Specktor et al. ............... 180/253
4,772,519  9/1988  Irvine .............................. 428/542.8

FOREIGN PATENT DOCUMENTS 3140767  5/1982  Fed. Rep. of Germany .

Primary Examiner—Ellis P. Robinson
Assistant Examiner—P. J. Ryan
Attorney, Agent, or Firm—Harness, Dickey & Pierce

[57] ABSTRACT

A self retaining shim for mounting between two surfaces is made of plastic and engages a projection from one of the surfaces on which the shim is to be mounted. The shim has inwardly directed deflectable tabs projecting into an aperture for engaging the projection to hold the shim in place while the two surfaces are joined.

9 Claims, 2 Drawing Sheets

SELF RETAINING INJECTION MOLDED SHIMS

BACKGROUND AND SUMMARY OF THE INVENTION

This invention relates generally to shim material and more particularly to a plastic shim adapted for application between two spaced surfaces.

Shims have been used for many years to provide proper spacing between two surfaces, provide a seal between two mating surfaces, or to adjust the height or position of a particular object spaced from another object. Shims are used in a variety of manufacturing operations to fill unwanted gaps or spaces in assembled articles caused by imperfectly fitting components. For example, in the automotive industry, steel shims are commonly used to fill gaps during the assembly of various components where subassemblies are bolted together. In other industries shims are used to compensate for alignment irregularities between mating surfaces and to adjust the orientation of a structure.

In large machinery mounting applications, a bed plate is typically formed and the machine is mounted on the bed plate via studs or bolts. The machine is leveled by placing shims of appropriate thicknesses between the machine base and the bed plate. A worker mounting a large piece of machinery such as a generator or an air conditioning unit, must place various sizes of shims between the unit base and the foundation. In situations where the foundation does not have upwardly projecting studs, positioning a shim between the mating surfaces may be difficult and possibly dangerous to the worker. If the piece of machinery is particularly heavy, positioning a loose shim correctly on the foundation is difficult. Often the shim moves from the desired position as the components are mated together requiring several attempts at proper placement of the shims. These conventional shims are usually metal and are relatively heavy, expensive and often prone to corrode.

In manufacturing situations where shims are required, it is desirable to be able to place a shim against one surface such that the shim remains against the surface until the other mating surface is joined. However, when using conventional shims the first surface must generally be upwardly facing with projecting pins or studs projecting upward so that when the shim is placed over the studs and onto the surface gravity retains the shims in position. Otherwise, if this first surface is slanted or downwardly facing, a conventional shim placed thereon will simply fall off.

Accordingly, it is a principal object of this invention to provide a plastic shim to overcome this disadvantage and to provide shims that are lightweight, rust free, simple to install, and will retain their position against a surface having a projection outward therefrom in any orientation until the two mating surfaces are joined.

A self retaining plastic shim according to the present invention has a generally flat plate shape with an aperture therethrough. The shim has integral opposing tabs projecting inward from the wall of the aperture. These tabs are preferably of decreasing thickness as the tab extends inward of the aperture. The tabs elastically deflect when a shim having these tabs is placed onto a surface having a projection such as a stud pushed through the aperture in the shim. The deflection of the tabs against the stud holds the shim in place against the surface of the first body until the first body with the shim attached is placed against a second body having a corresponding aperture to receive the bolt or stud.

Thus when the shim is simply applied to one surface having projecting studs, bolts or pins, it is unnecessary to manually hold the shim in place while the two surfaces are joined.

Further objects, features and advantages of the invention will become more evident from a consideration of the following detailed description when taken in conjunction with the accompanying drawing and the appended claims.

DETAILED DESCRIPTION OF THE INVENTION

Figure 1:
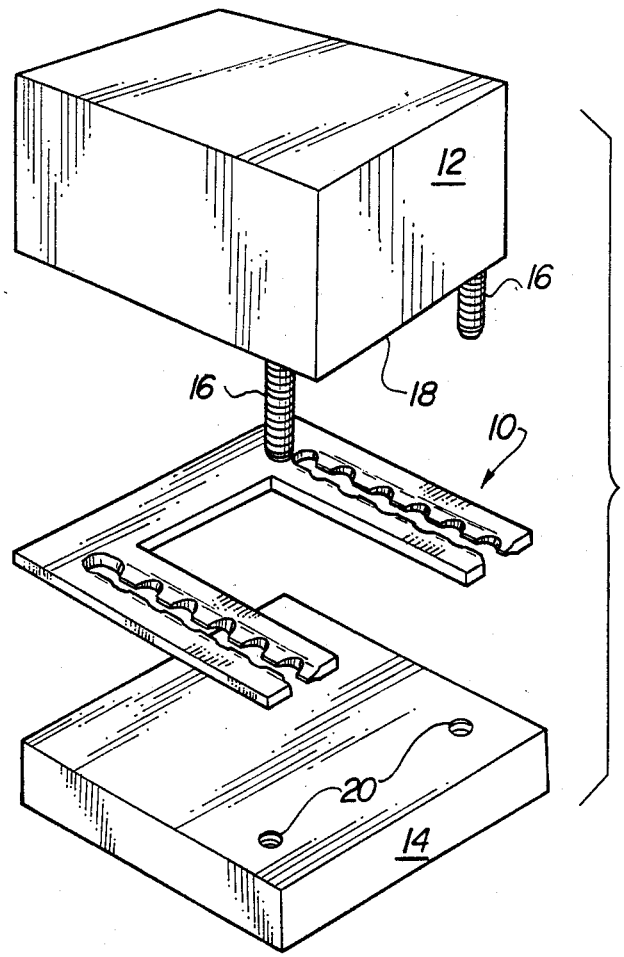
FIG. 1 is an exploded perspective view of a first and second body having a self retaining molded shim according to a first embodiment of the present invention therebetween.
Figure 2:
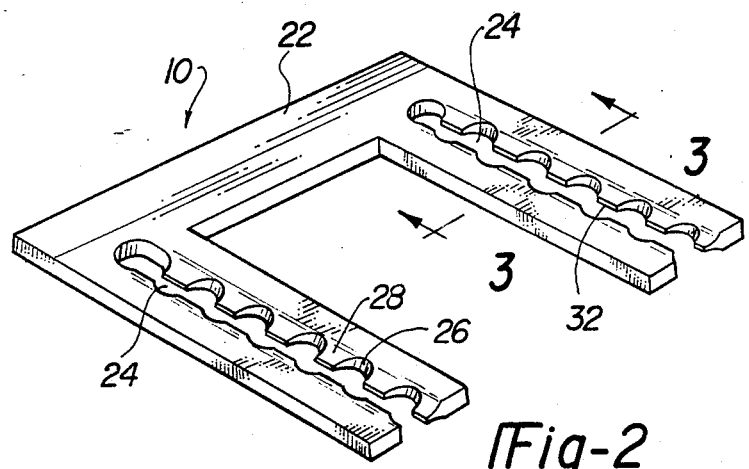
FIG. 2 is an enlarged perspective view of the embodiment of the self retaining shim according to the present invention shown in FIG. 1.

Turning now to the drawing, a shim 10 according to a preferred embodiment of the present invention is shown placed between block 12 and base 14. Block 12 and base 14 are merely representative of two objects to be mated to simplify the explanation of the invention. Block 12 has studs 16 protruding downward from the bottom surface 18. Bottom block 14 has corresponding holes 20 for receiving studs 16 when blocks 12 and 14 are mated together with shim 10 sandwiched between them.

Lightweight shim 10 in this embodiment, is a generally C-shaped flat body 22 which has a slot 24 in each leg of body 22. The general shape of body 22 is merely illustrative. Other shapes may also be formed depending on the particular installation and the particular shapes of the surfaces to be mated.

Figure 3:
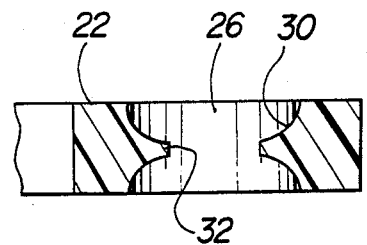
FIG. 3 is a partial sectional view through the shim shown in FIG. 2 taken along the line 3—3.

Spaced along slot 24 and projecting from sidewall 26 are deflectable tabs 28 which project inward of slot 24. As shown in FIG. 3, deflectable tabs 28 have tapered cross sections narrowing from sidewall 26 in a concave taper 30 to terminating edge 32. Because of this taper, tabs 28 are increasingly elastically deflectable as terminating edge 32 is approached.

Figure 4:
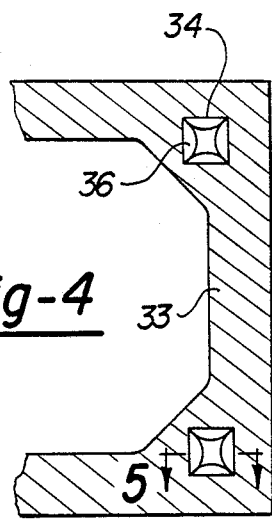
FIG. 4 is a partial plan view of a second embodiment of the present invention.

An alternative embodiment of the present invention is shown in FIG. 4. In this embodiment, instead of slots 24 being formed in the body, square apertures 34 are provided with convex arcuate inward tabs 36 projecting inward from each of the sidewalls of square apertures 34. Once again, tabs 36 are integral with body 33 and perform the same function as in the previous embodiment.

Figure 5:
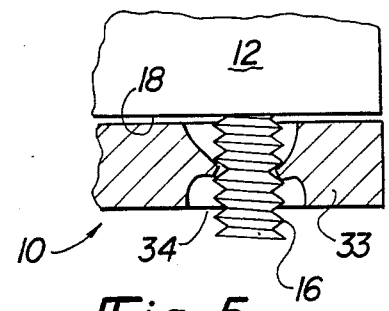
FIG. 5 is a partial sectional view taken along line 5—5 in FIG. 4 of the second embodiment of the shim according to the present invention with the shim mounted against a surface having a stud protruding through the aperture.

FIG. 5 shows a partial sectional view of the shim body 33 of FIG. 4 applied adjacent to block 12. Tab 36 will deflect as shown when passed over stud 16 and exert a retaining force against stud 16 sufficient to retain the lightweight shim 10 against surface 18.

Other embodiments may be visualized depending on the particular application of the shims having the self retaining tab feature integral to the shim body. For example, in the shim design shown in FIGS. 1 and 3, the tabs on opposite sides of the slots could be directly opposing one another rather than being partially off-set as shown. Other apertures and tab formations may also be used. This feature is purely a matter of detailed design and does not depart from the spirit of the present invention.

Figure 6:
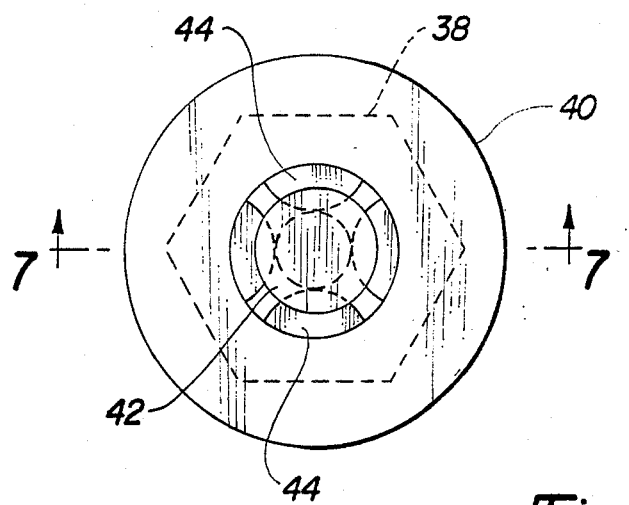
FIG. 6 is a plan view of a third embodiment of the shim according to the present invention illustrating a bolt suspended by the shim by the projecting tabs gripping the threads of the bolt.
Figure 7:
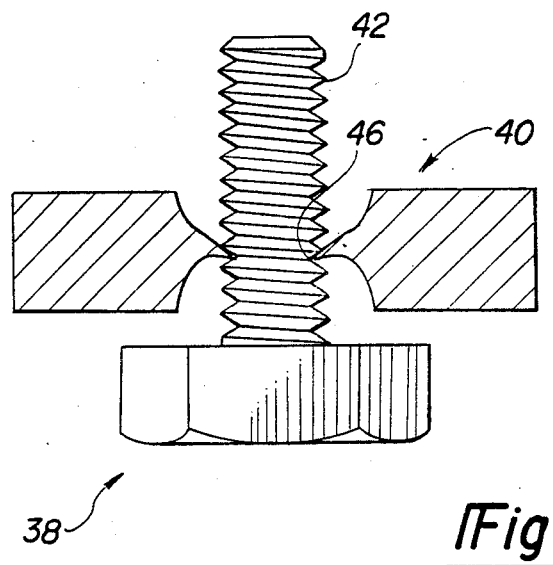
FIG. 7 is a sectional view of the shim and bolt shown in FIG. 6 taken along the line 7—7.

A third embodiment of the shims according to the present invention is shown in FIGS. 6 and 7. A bolt 38 is shown in FIG. 6 gripped by shim 40. Threads 42 on bolt 38 engage tabs 44 to hold bolt 38 on shim washer 40. As shown in FIG. 7, in this embodiment, tabs 44 are preferably slightly narrower in cross section then the angle 46 formed between threads 42. Thus full engagement of tabs 44 to threads 42 is achieved compared to the partial engagement with the treads as shown in the embodiment illustrated in FIG. 5.

The shim washer 40 illustrated in FIGS. 6 and 7 is shown holding the bolt 38 in place so that bolt 38 does not fall out of shim washer 40. Similarly, if bolt 38 were inverted, shim washer 40 would remain on bolt 38. An extension of the embodiment shown in FIGS. 6 and 7 then would be a ring shaped shim with a plurality of spaced apart apertures, each having a bolt 38 held in place by tabs similar to tabs 44 shown in FIGS. 6 and 7.

Typical plastic polymeric materials that are appropriate for shims according to the present invention may be of various compositions such as ABS, acetyl, polyamide, or other thermoplastic materials which have the structural strength necessary to accommodate compressive loads and have other physical characteristics desirable for the particular service application, such as being suitable for temperature, humidity, other environmental conditions, resistant to vibration, etc..

Self retaining plastic shims according to the present invention may be formed by the injection molding process. This process can provide simple and inexpensive shims of various thicknesses having integral tabs projecting into the apertures. The tabs may be of various shapes, two of which are shown in FIGS. 3 and 4. Many other shapes of the tabs are possible depending on the particular detailed application and the particular plastic material being utilized.

The self retaining plastic shims according to the present invention simplify a component assembly process where shims are required as well as provide an inexpensive inherent means of temporarily positioning a shim on one surface until the opposing surfaces can be mated. As these shims are made of plastic, they are also rust free, eliminating potential long term corrosion problems found with conventional metal shims.

The invention has been described above in an illustrative manner and it is to understood that the terminology that has been used is intended to be in the nature of words and description rather than that of limitation. Obviously many other modifications and variations of the present invention are possible in light of the above teachings. It is therefore to be understood that within the scope of the appended claims the invention may be practiced other than what is specifically described.

What is claimed is:

1. A structural plastic shim for mounting in the space between a pair of closely spaced surfaces, one of which has a shaped projection protruding outwardly therefrom and the other of which has an opening therein for receiving said projection when said surfaces are mated, said shim comprising:

a generally plate shaped body positioned adjacent said one surface and having an aperture therethrough, said aperture being of a size to receive said projection therethrough, and a deflectable tab integral with said body and extending from said body into said aperture, said tab being engageable with said projection when the projection is extended through said aperture so as to retain said shim body on said projection as said surfaces are mated.

2. The shim according to claim 1 wherein said body further comprises a plurality of spaced apart deflectable tabs projecting inwardly from said sidewall toward the interior of said aperture.

3. The shim according to claim 2 wherein each of said deflectable tabs tapers from said sidewall toward a terminating edge inwardly of said aperture, said tab being tapered to gradually increase the deflectability of said tab along said taper so that the tab has greatest flexibility at said terminating edge.

4. The shim according to claim 3 wherein said shaped projection is a threaded shaft and said aperture is a circular bore through said body, and said tabs are equally spaced apart about the bore, said terminating edges deflectably engaging said threads on said shaft to retain said shim body in position against said first surface.

5. The shim according to claim 3 wherein said aperture is an elongated slot having a major axis and opposing sidewalls, said tabs projecting inward toward the opposing sidewall and normal to said axis, some of said tabs engaging said projection allowing adjustment of the position of said shim body on said first surface in the direction of said axis while said tabs retain said shim body against said surface.

6. The shim according to claim 3 wherein said terminating edges of said tabs have a convex arcuate shape toward the interior of said aperture.

7. The shim according to claim 6 wherein said aperture has a polygon shape with a plurality of sidewalls and a single tab projecting inward of said aperture from each sidewall.

8. A structural plastic shim comprising:

a flat body having a transverse aperture therethrough; and at least one deflectable tab integrally formed with said body and extending from said body into said aperture.

9. The shim according to claim 8 wherein said at least one deflectable tab is tapered in a direction from said body toward a terminal edge of said tab so as to increase the flexibility of said at least one tab at the terminal edge.

* * * * *